Sept. 11, 1962     S. A. MUIRHEAD     3,053,546

POWERED LIFT FOR HAND TRUCKS

Filed April 28, 1960

INVENTOR.
SAMUEL A. MUIRHEAD
BY
Buckhorn, Cheatham & Blore
ATTORNEYS 3,053,546
POWERED LIFT FOR HAND TRUCKS
Samuel A. Muirhead, The Dalles, Oreg., assignor to
Kenneth A. Jernstedt, Hood River, Oreg.
Filed Apr. 28, 1960, Ser. No. 25,374
2 Claims. (Cl. 280—5.3)

The present invention relates to hand trucks and more particularly to a hand truck having a power mechanism to assist in elevating or lowering the same.

Moving a conventional hand truck bearing a heavy load such as a household refrigerator or a counter or freezer up or down a flight of stairs has been a difficult and oftentimes hazardous job. Various arrangements have been suggested to provide a power mechanism to assist in moving a loaded hand truck up or down steps but heretofore no practical arrangement has been suggested.

It is, therefore, a general object of the invention to provide a conventional hand truck, such as is utilized in moving furniture, household appliances and like bulky objects, with new and improved means to assist in elevating or lowering the hand truck up or down, respectively, a flight of stairs.

More particularly it is an object of the invention to provide a new and improved lifting mechanism for a hand truck which permits an operator to maintain secure control over the hand truck at all times during the operation of the elevating mechanism.

A further object is to provide a simple but rugged elevating means for a hand truck.

Still another object is to provide a hand truck lifting mechanism which is operated pneumatically from a reservoir mounted on the truck.

Still further objects and advantages of the invention will become more apparent hereinafter.

In accordance with the illustrated embodiment the hand truck of the present invention comprises a generally upright frame having a pair of supporting wheels at the lower end. Mounted on the frame is a jack means for elevating the frame and which jack means includes a pair of members movable relative to one another. One of the jack members is pivotably mounted on the frame so that the truck can be swung when elevated onto a stair tread or over a curb or off from the same and thereafter lowered onto the new supporting surface.

For a more detailed description of the invention reference is made to the following specification taken in conjunction with the accompanying drawings wherein.

Figure 1:
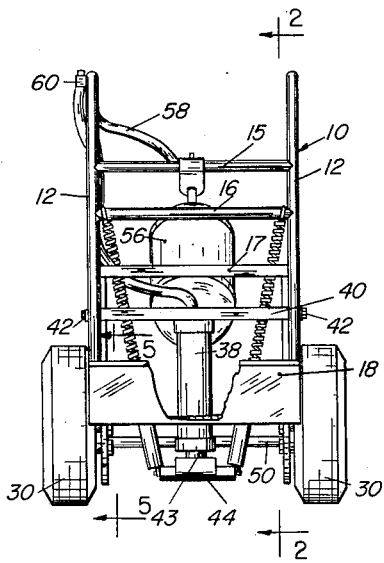
FIG. 1 is a front elevation of a hand truck made in accordance with the invention.

The illustrated hand truck comprises a frame 10 including a pair of opposite side stringers 12 which are bent rearwardly at their upper ends to define a pair of handles 14. The side stringers 12 are connected by means of cross bars 15, 16 and 17 and support at their lower ends a load supporting plate 18.

Attached as by welding to each stringer 12 is a wheel mounting plate 26 to which are suitably affixed axles 28 for supporting wheels 30. The plates 26 also serve as a mounting means for a brake assembly for each wheel, the details which are not shown since any conventional braking system can be utilized. The brakes are individually operable by means of cables 32 extending from the corresponding wheel brake to an operating lever 34 mounted adjacent the hand grip 14 on the corresponding side of the truck.

Figure 2:
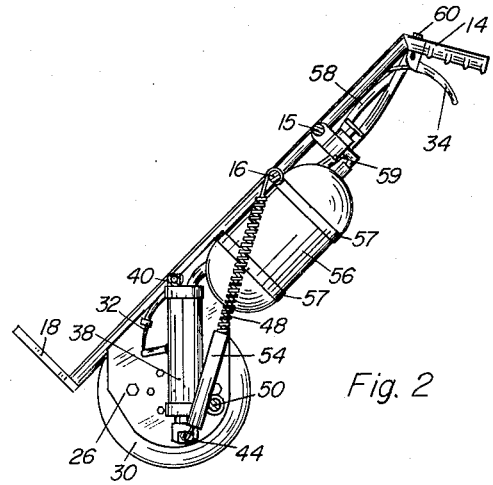
FIG. 2 is a sectional view taken along line 2—2 of FIG. 1.
Figure 3:
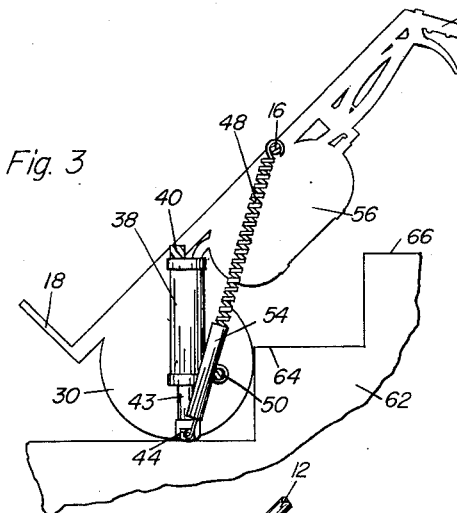
FIG. 3 is a schematic view of the truck similar to FIG. 2 showing the first step in operation of the jack means to elevate the truck.

In accordance with the invention the truck is provided with a jack means to facilitate elevation or lowering of the truck over curbs, steps or the like. In the illustrated embodiment the jack means comprises a cylinder 38 one end of which is suitably secured as by welding to a cross bar 40 which is supported between the stringers 12 for pivotal movement about its longitudinal axis by suitable means such as studs 42. Extending from the lower end of the cylinder 38 is a ram 43 having on its lower end a foot 44 preferably provided on its lower surface with a non-skid material such as a coating or layer of rubber. The foot 44 is somewhat elongated transversely of the truck and has attached to each end thereof one of a pair of springs 48 which are connected at their opposite ends to the frame 10 at a point between the mounting bar 40 and the handles 14. The springs 48 urge the ram 43 to its retracted position within the cylinder 38 and also urge the cylinder to swing to a rearward position in which it engages a stop bar 50 extending between the wheel mounting plates 26. As best shown in FIGURES 2 and 3 the crossbar 40 and stop bar 50 are so located that when the frame 10 of the hand truck is in its normal load carrying position, the axis of the cylinder 38 is substantially vertical. Tubes 54 of rubber or other soft material may be positioned on the springs 48 to protect the edges of stair treads from abrasion.

Figure 4:
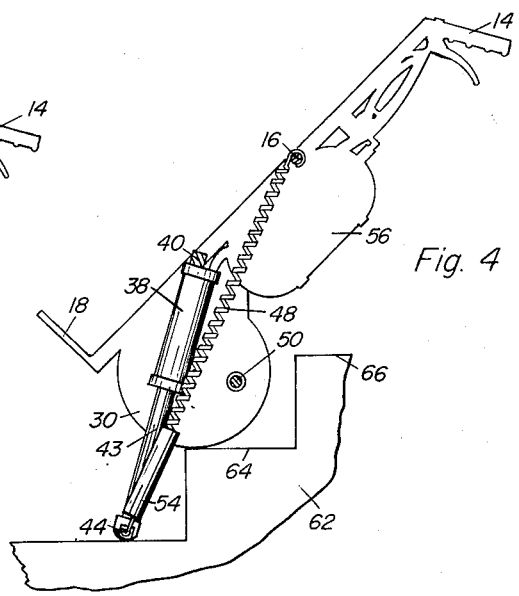
FIG. 4 is a view similar to FIG. 3 showing the truck with the jack extended and the truck moved onto a stair tread.
Figure 5:
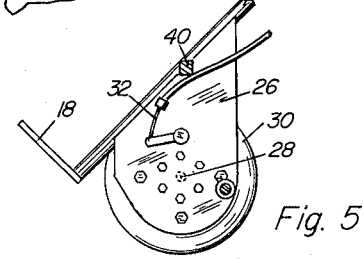
FIG. 5 is a sectional view taken along line 5—5 of FIG. 1.

Means are provided for operating the ram including a tank 56 mounted upon the frame 10 by suitable means such as straps 57 and which tank is adapted to contain a supply of air under pressure. A conventional guage and cutoff valve assembly, indicated at 59, may be provided on the tank 56. The tank is connected by a hose 58 through a manually operated valve 60 provided on one of the operator handles to the top end of the cylinder 38. The valve 60 may be any suitable conventional valve, the illustrated valve being a plunger actuated type, and is arranged to pass air, when operated, from the tank 56 to the top of the cylinder 38 so as to cause the ram 43 to be extended. Preferably the ram 43 and cylinder 38 are of such length that when the ram is retracted, the lower end thereof is above the ground engaging surface portion of the wheels 30, as shown in FIG. 2, and preferably the ram is extendible relative to the cylinder so as to enable the lower end of the ram to move to a position relatively below the surface engaging portion of the wheels a sufficient amount to enable the truck to be raised by at least the height of a stair tread, as shown in FIG. 4. Any suitable conventional means may be provided in the valving system for the cylinder 38 to enable air to be exhausted from the cylinder when the valve 60 is released by the operator so as to permit retraction of the ram 43 from its extended position.

The operation of the hand truck is quite apparent from FIGURES 3 and 4. Referring first to FIGURE 3, when the truck is normally loaded and in an inclined attitude such as shown in FIGURE 3, the axis of the cylinder 38 will be substantially vertical and will be positioned slightly to the rear of the axles 28. To move the truck up a flight of stairs 62, the operator preferably moves the hand truck so that the wheels 30 engage the edge of the first step 64, as shown in FIG. 3. The valve 60 is then manipulated by the operator to extend the ram 43 which will cause the truck to be elevated. As the truck elevates, the operator applies a slight rearward pressure on the handles to urge the truck in the direction of the step 64 and as the wheels 30 are elevated a sufficient amount, he will be able to roll the truck onto the tread of the step 64. As the truck is moved rearwardly the cylinder 38 will rotate about the horizontal axis of the mounting bar 40 as shown in FIGURE 4. When the wheels 30 have been moved onto the tread of the step 64, the operator releases the valve 60 whereupon the springs 48 will return the ram 43 to its retracted position and swing the cylinder 38 to its vertical position against the stop 50 to permit the procedure to be repeated to raise the truck to the next higher step indicated at 66 and on up the entire flight in like fashion. The wheel brakes are operated as necessary to maintain secure control over the truck.

In lowering the truck down a flight of steps, the operator swings the cylinder 38 forwardly by pushing it with his foot and then extends the ram 43 so that it engages the tread of the next lower step. He then pushes the truck forwardly so that the load will transfer from the wheels to the ram at the same time manipulating the valve 60 slowly to release air from the cylinder 38 whereupon the truck may be lowered under control onto the next lower step. This procedure is repeated to lower the truck successively down the flight of steps. All the while the operator may utilize the hand brakes to maintain the truck under complete control.

The tank 56 can be recharged as necessary from any suitable source of compressed air, for example, at a service station or from a compressor mounted upon moving van or vehicle.

Having illustrated and described a preferred embodiment of the invention it will be apparent that the invention permits of modification in arrangement and detail. I claim all such modifications as come within the true scope and spirit of the appended claims.

I claim:

1. A hand truck comprising a generally upright, elongate frame, a pair of wheels at the lower end of said frame and hand grip means at the upper end, a jack means including a cylinder and a ram extending from one end of said cylinder, means on said frame pivotally mounting said cylinder thereon by the end thereof opposite said one end for movement about a horizontal axis, said ram being retractable relative to said cylinder so as to bring, when the axis of the cylinder is vertical and said frame is in its load carrying position, the lower end of the ram to a position relatively above the elevation of the ground engaging surface portion of said wheels and being extendible relative to said cylinder so as to move the lower end of the ram to a position relatively below said wheel surface portion thus to enable said truck to be raised and lowered by said jack means, a stop means on said frame engageable by said jack means when said cylinder axis is vertical and said frame is in said load carrying position, said stop means limiting the swinging movement of said jack means only in the direction of said handle, and resilient means urging said jack means against said stop means.

2. A hand truck comprising a generally upright, elongate frame, a pair of wheels at the lower end of said frame and hand grip means at the upper end, a jack means including a cylinder and a ram extending from one end of said cylinder, means on said frame pivotally mounting said cylinder thereon by the end thereof opposite said one end for movement about a horizontal axis, said ram being retractable relative to said cylinder so as to bring, when the axis of the cylinder is vertical and said frame is in load carrying position, the lower end of the ram to a position relatively above the elevation of the ground engaging surface portion of said wheels and being extendible relative to said cylinder so as to move the lower end of the ram to a position relatively below said wheel surface portion thus to enable said truck to be raised and lowered by said jack means, a stop means on said frame engageable by said jack means when said cylinder axis is vertical and said frame is in said load carrying position, said stop means limiting the swinging movement of said jack means only in the direction of said handle, and resilient means urging said jack means against said stop means comprising a pair of springs connected between the free end of said jack and a point on said frame between said hand grip means and said cylinder mounting means.

References Cited in the file of this patent

UNITED STATES PATENTS

| | | |
|---|---|---|
| 1,170,320 | Patterson | Feb. 1, 1916 |
| 1,334,726 | White | Mar. 23, 1920 |
| 2,023,336 | Moore et al. | Dec. 3, 1935 |
| 2,608,258 | Jenkins | Aug. 26, 1952 |
| 2,701,005 | Bennett et al. | Feb. 1, 1955 |
| 2,740,637 | Cononelos | Apr. 3, 1956 |
| 2,823,921 | Lagaard | Feb. 18, 1958 |

FOREIGN PATENTS

| | | |
|---|---|---|
| 419,175 | Italy | Mar. 17, 1947 |